(12) United States Patent
Alexander, III et al.

(10) Patent No.: US 6,898,700 B2
(45) Date of Patent: *May 24, 2005

(54) EFFICIENT SAVING AND RESTORING STATE IN TASK SWITCHING

(75) Inventors: William C. Alexander, III, Hillsboro, OR (US); Shreekant S. Thakkar, Portland, OR (US); Patrice L. Roussel, Portland, OR (US); Thomas Huff, Portland, OR (US); Bryant E. Bigbee, Aloha, OR (US); Stephen A. Fischer, Shingle Springs, CA (US)

(73) Assignee: Intel Corporation, Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/053,398

(22) Filed: Mar. 31, 1998

(65) Prior Publication Data

US 2001/0052065 A1 Dec. 13, 2001

(51) Int. Cl.[7] .............................................. G06F 9/22
(52) U.S. Cl. ...................................................... 712/244
(58) Field of Search ................................. 712/204, 244

(56) References Cited

U.S. PATENT DOCUMENTS

| | | | | |
|---|---|---|---|---|
| 4,454,579 A | * | 6/1984 | Pilat et al. .................. | 364/200 |
| 5,410,682 A | * | 4/1995 | Sites et al. ..................... | 712/41 |
| 5,535,409 A | * | 7/1996 | Larvoire et al. ............... | 712/37 |
| 5,787,243 A | * | 7/1998 | Stiffler ......................... | 712/228 |
| 5,873,001 A | * | 2/1999 | Brinker et al. .............. | 712/300 |
| 5,893,121 A | * | 4/1999 | Ebrahim ...................... | 712/216 |
| 5,933,626 A | * | 8/1999 | Mahalingaiah et al. ..... | 395/568 |
| 6,026,239 A | * | 2/2000 | Patrick et al. .............. | 712/204 |

OTHER PUBLICATIONS

Visual Instruction Set (VIS) User's Guide, Sun Microsystems, Version 1.1, Mar. 1997, pp i–xii, 1–127.

AMD–3D Technology Manual, Advanced Micro Devices (AMD), Feb. 1998, pp i–x, 1–58.

* cited by examiner

*Primary Examiner*—David Y. Eng
(74) *Attorney, Agent, or Firm*—Blakely, Sokoloff, Taylor & Zafman LLP

(57) ABSTRACT

The present invention discloses a method and apparatus for saving and restoring registers. A single instruction is decoded. The single instruction moves contents of a plurality of registers associated with a functional unit in a processor to a memory; the processor operates under a plurality of operational modes and operand sizes. The single instruction arranges the contents in the memory according to a predetermined format into a plurality of groups, each group is aligned at an address boundary which corresponds to a multiple of $2^N$ bytes. The predetermined format is constant for the plurality of operational modes and operand sizes. The single instruction retains the contents of the plurality of registers after moving.

26 Claims, 4 Drawing Sheets

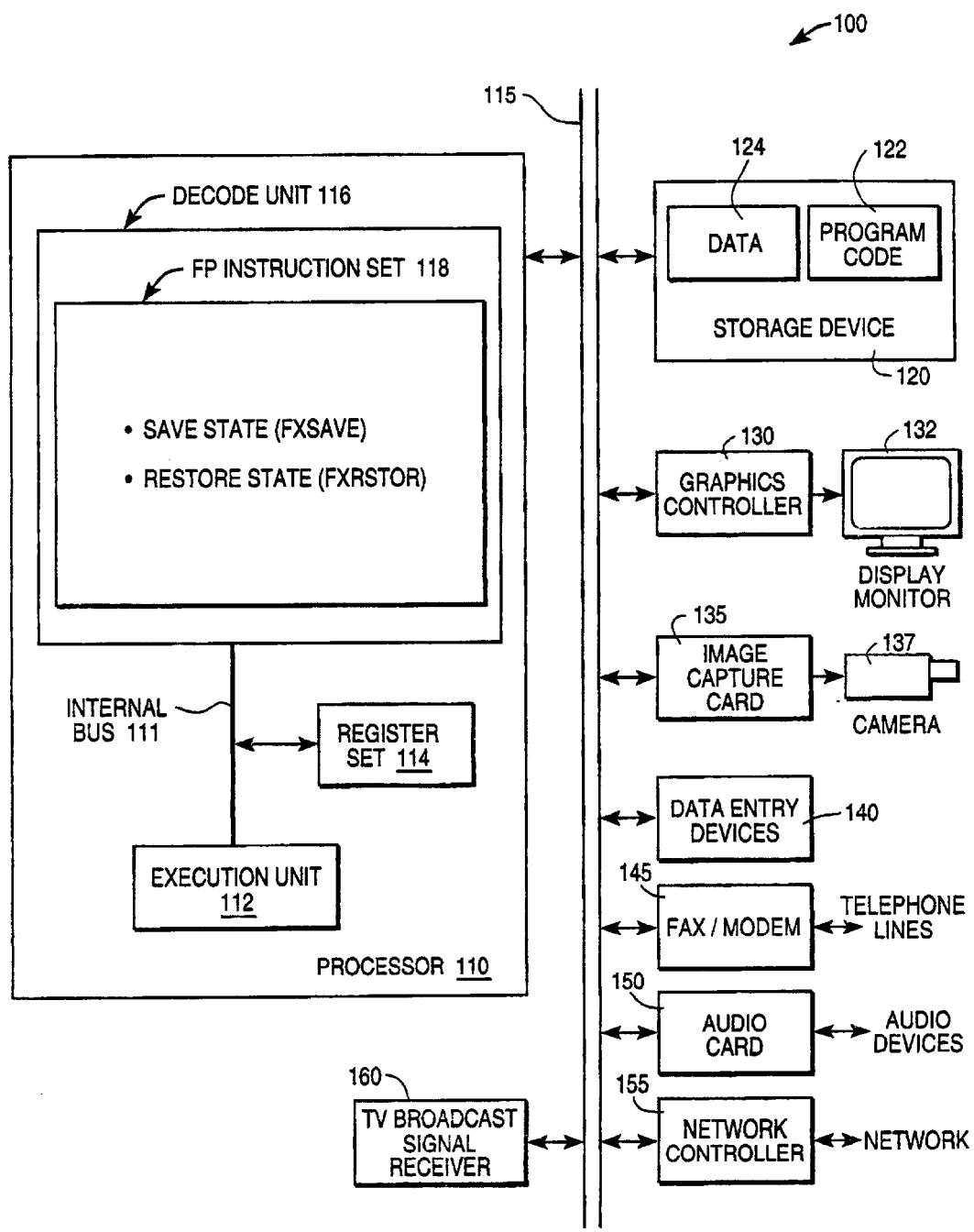
FIG_1

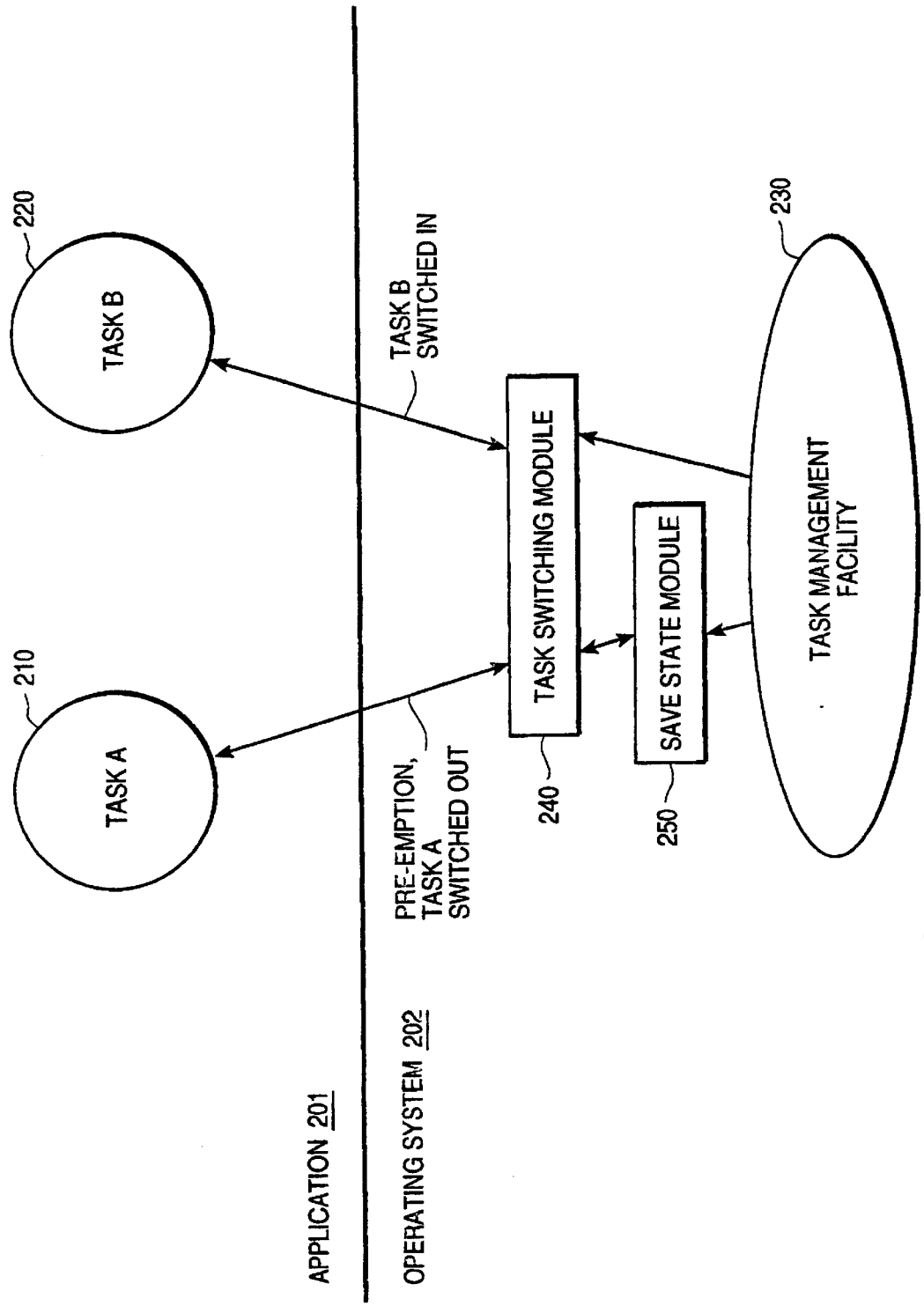
FIG_2

| | 15 | 14 | 13 | 12 | 11 | 10 | 9 | 8 | 7 | 6 | 5 | 4 | 3 | 2 | 1 | 0 | BYTE NO. |
|---|---|---|---|---|---|---|---|---|---|---|---|---|---|---|---|---|---|
| 310 | RESERVED | | CS | | IP | | | | FOP | | FTW | | FSW | | FCW | | 0 |
| 312 | RESERVED | | | | MXCSR | | | | RESERVED | | DS | | DP | | | | 16 |
| 320₀ | RESERVED | | | | | | | | ST0 / MM0 | | | | | | | | 32 |
| 320₁ | RESERVED | | | | | | | | ST1 / MM1 | | | | | | | | 48 |
| 320₂ | RESERVED | | | | | | | | ST2 / MM2 | | | | | | | | 64 |
| 320₃ | RESERVED | | | | | | | | ST3 / MM3 | | | | | | | | 80 |
| 320₄ | RESERVED | | | | | | | | ST4 / MM4 | | | | | | | | 96 |
| 320₅ | RESERVED | | | | | | | | ST5 / MM5 | | | | | | | | 112 |
| 320₆ | RESERVED | | | | | | | | ST6 / MM6 | | | | | | | | 128 |
| 320₇ | RESERVED | | | | | | | | ST7 / MM7 | | | | | | | | 144 |
| 330₀ | XMM0 | | | | | | | | | | | | | | | | 160 |
| 330₁ | XMM1 | | | | | | | | | | | | | | | | 176 |
| 330₂ | XMM2 | | | | | | | | | | | | | | | | 192 |
| 330₃ | XMM3 | | | | | | | | | | | | | | | | 208 |
| 330₄ | XMM4 | | | | | | | | | | | | | | | | 224 |
| 320₅ | XMM5 | | | | | | | | | | | | | | | | 240 |
| 330₆ | XMM6 | | | | | | | | | | | | | | | | 256 |
| 330₇ | XMM7 | | | | | | | | | | | | | | | | 272 |
| 350₀ | RESERVED | | | | | | | | | | | | | | | | 288 |
| | RESERVED | | | | | | | | | | | | | | | | ⋮ |
| 350ₙ | RESERVED | | | | | | | | | | | | | | | | 496 |

FIG_3

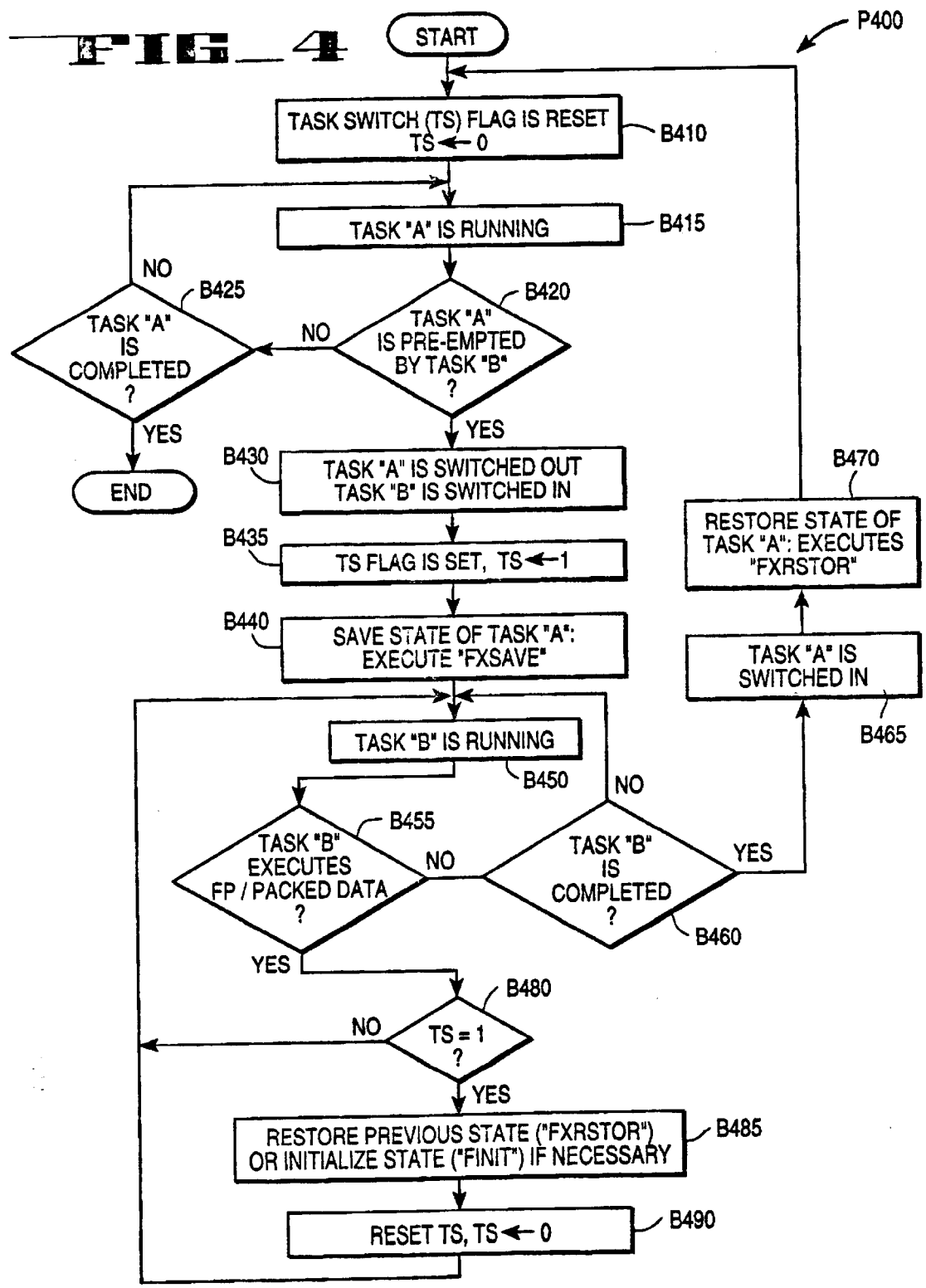
FIG_4

EFFICIENT SAVING AND RESTORING STATE IN TASK SWITCHING

BACKGROUND OF THE INVENTION

1. Field of the Invention

This invention relates in general to the field of operating systems in digital computers, and in particular, to an apparatus and method for saving and restoring state during task switching.

2. Description of Related Art

In multitasking operating systems (OS), it is common to switch tasks as often as necessary. The task switching is typically managed by task management facilities. Task switching essentially refers to the process of transferring the use of the processor from one task to the next. A task may be postponed, deferred, or terminated during task switching. If a task is postponed or deferred, it is important that all the relevant information about the task is restored when the task resumes its use of the processor.

Saving and restoring the state of the processor during task switching are two important activities for an efficient multitasking OS. When there are many tasks that are switched into and out of the OS, the time spent for saving and restoring the processor's state may be significant.

The state of the processor for a particular task is determined by the contents of various control/status registers and data registers. The Intel Architecture (IA) provides a rich set of registers including the aliased floating-point (FP) and integer packed data registers. These registers are to be saved during a context switch. Saving these registers in the prior art IA has a number of drawbacks.

First, the format of the saved memory image depends on the operating mode of the processor (e.g., protected mode, real-address mode) and on the operand-size attribute in effect (e.g., 32-bit, 16-bit). Therefore, the saving of the processor's state requires branching in the microcode which results in long processing time and inefficient memory usage.

Second, the prior art IA saves the Floating-Point Unit (FPU) tag word as eight 2-bit encodings. This process incurs undesirable time for performing the valid bit to 2-bit encoding translation.

Third, the prior art IA state saving automatically initializes the floating-point unit by loading default values into the FPU control word, FPU status word, FPU tag word, data pointer, instruction pointer, and last instruction opcode. This initialization step is time consuming and in many cases is unnecessary.

Lastly, the memory image saved by the prior art IA has irregular address boundaries. This creates inefficient memory allocation and increased software overhead.

Therefore there is a need in the technology to provide an improved and efficient mechanism to save and restore processor's state during a context switch.

SUMMARY OF THE INVENTION

The present invention discloses a method and apparatus for saving and restoring registers. A single instruction is decoded. The single instruction moves contents of a plurality of registers associated with a functional unit in a processor to a memory; the processor operates under a plurality of operational modes and operand sizes. The single instruction arranges the contents in the memory according to a predetermined format into a plurality of groups, each group is aligned at an address boundary which corresponds to a multiple of $2^N$ bytes. The predetermined format is constant for the plurality of operational modes and operand sizes. The single instruction retains the contents of the plurality of registers after moving.

BRIEF DESCRIPTION OF THE DRAWINGS

The features and advantages of the present invention will become apparent from the following detailed description of the present invention in which:

FIG. 1 is a diagram illustrating one embodiment of a computer system in accordance with the teachings of the present invention.

FIG. 2 illustrates a task switching mechanism according to one embodiment of the present invention.

FIG. 3 illustrates a data structure for the processor's state according to one embodiment of the invention.

FIG. 4 illustrates the operation of a task switching according to one embodiment of the invention.

DESCRIPTION OF THE PRESENT INVENTION

The present invention discloses a method and system for saving and restoring the processor's state during a context switch. Elements of the processor's state, as reflected by contents of registers associated with the floating-point unit and packed data unit, are streamlined and the saving is generic for all operational modes of the processor and operand sizes. The storing of contents of registers is aligned at 16-byte boundaries. In addition, the current processor's state is saved to the memory without being initialized. By streamlining the data structure of the processor's state and eliminating unnecessary operations, the time required to save and restore the processor's state is significantly reduced.

In the following description, for purposes of explanation, numerous details are set forth in order to provide a thorough understanding of the present invention. However, it will be apparent to one skilled in the art that these specific details are not required in order to practice the present invention. In other instances, well known electrical structures and circuits are shown in block diagram form in order not to obscure the present invention unnecessarily.

FIG. 1 is a diagram illustrating one embodiment of a computer system 100 in accordance with the teachings of the present invention. Computer system 100 comprises a processor 110, a storage device 120, and a bus 115. The processor 110 is coupled to the storage device 120 by the bus 115. In addition, a number of user input/output devices 140 (e.g., keyboard, mouse) are also coupled to the bus 115. The processor 110 represents a central processing unit of any type of architecture, such as CISC, RISC, VLIW, or hybrid architecture. In addition, the processor 110 could be implemented on one or more chips. The storage device 120 represents one or more mechanisms for storing data. For example, the storage device 120 may include read only memory (ROM), random access memory (RAM), magnetic disk storage mediums, optical storage mediums, flash memory devices, and/or other machine-readable mediums. The bus 115 represents one or more buses (e.g., AGP, PCI, ISA, X-Bus, VESA, etc.) and bridges (also termed as bus controllers). While this embodiment is described in relation to a single processor computer system, the invention could be implemented in a multiprocessor computer system.

In addition to other devices, one or more of a network controller 155, a TV broadcast signal receiver 160, a fax/ modem 145, a video capture card 135, an audio card 150, and a graphics controller 130 may optionally be coupled to bus 115. The network controller 155 represents one or more network connections (e.g., an ethernet connection). While the TV broadcast signal receiver 160 represents a device for receiving TV broadcast signals, the fax/modem 145 represents a fax and/or modem for receiving and/or transmitting analog signals representing data. The image capture card 135 represents one or more devices for digitizing images (i.e., a scanner, camera, etc.). The audio card 150 represents one or more devices for inputting and/or outputting sound (e.g., microphones, speakers, magnetic storage devices, optical storage devices, etc.). The graphics controller 130 represents one or more devices for generating images (e.g., graphics card).

FIG. 1 also illustrates that the storage device 120 has stored therein data 124 and program code 122. Data 124 represents data stored in one or more of the formats described herein. Program code 122 represents the necessary code for performing any and/or all of the techniques in the present invention. Of course, the storage device 120 preferably contains additional software (not shown), which is not necessary to understanding the invention.

FIG. 1 additionally illustrates that the processor 110 includes a decode unit 116, a set of registers 114, an execution unit 112, and an internal bus 111 for executing instructions. Of course, the processor 110 contains additional circuitry, which is not necessary to understanding the invention. The decode unit 116, registers 114 and execution unit 112 are coupled together by the internal bus 111. The decode unit 116 is used for decoding instructions received by processor 110 into control signals and/or microcode entry points. In response to these control signals and/or microcode entry points, the execution unit 112 performs the appropriate operations. The decode unit 116 may be implemented using any number of different mechanisms (e.g., a look-up table, a hardware implementation, a PLA, etc.). While the decoding of the various instructions is represented herein by a series of if/then statements, it is understood that the execution of an instruction does not require a serial processing of these if/then statements. Rather, any mechanism for logically performing this if/then processing is considered to be within the scope of the implementation of the invention.

The decode unit 116 is shown including the processor state as a save state and a restore state instruction that respectively saves and restores data 124 in the formats described herein. In addition to the save and restore instructions, the processor 110 can include new instructions and/or instructions similar to or the same as those found in existing general purpose processors. For example, in one embodiment the processor 110 supports an instruction set which: 1) is compatible with the Intel Architecture instruction set used by existing processors (such as the Pentium® Pro processor); and 2) includes new extended instructions that operate on "extended operands". In one embodiment, the extended instructions are Single Instruction Multiple Data (SIMD) floating-point instructions that operate on 128-bit packed data operands, having four single-precision data elements. Alternative embodiments could implement different instructions (e.g., scalar, integer, etc.) Alternative embodiments of the invention may contain more or less, as well as different, packed data instructions and still utilize the teachings of the invention.

The registers 114 represent a storage area on processor 110 for storing information, including control/status information, integer data, floating point data, integer packed data and extended operand data. It is understood that one aspect of the invention is the described instruction set for operating on control/status information and packed data. According to this aspect of the invention, the storage area used for storing the control/status information and packed data is not critical.

FIG. 2 illustrates a task switching mechanism according to one embodiment of the present invention. FIG. 2 shows two logical areas: an application area 201 and an operating system (OS) area 202. In the application area 201, there are two tasks: a task A 210 and a task B 220. As is known by one skilled in the art, the application area 201 may have a number of tasks. The use of two tasks A and B is mainly for illustrative purposes. The OS area 202 comprises a task management facility 230, a task switching module 240, and a state saving module 250. As is known by one skilled in the art, the OS area 202 may comprise many additional elements, such as a task scheduler, a task prioritizer, etc.

In the illustrative example shown in FIG. 2, task A 210 and task B 220 are two tasks running in the application area 201. Task A 210 is pre-empted by task B 220. The OS switches task A 210 out by deallocating task A's resources which include the processor. The OS then switches task B 220 in by assigning the processor to run task B 220. The task switching (TS) module 240 performs the task switching by updating the task switching flag, the scheduling table, etc. The state save module 250 performs the saving of the processor's state of the task A 210. The processor's state may be saved before or after task B is switched in. In one embodiment, the processor's state is saved only if the incoming task, task B 220 in this example, executes instructions and/or operates such that the relevant portion(s) of the processor's state may be affected. These relevant portions may include the aliased floating-point unit (FPU) registers, the integer packed data registers, the extended data registers, and other control/status information. In another embodiment, the OS performs saving the processor's state regardless of whether task B 220 may modify the content of the relevant portions of the processor's state.

FIG. 3 illustrates a data structure 300 in the memory for the processor's state according to one embodiment of the invention. The format of the data structure is shown for illustrative purposes. Other formats may be used. The format in FIG. 3 is advantageous because it has the following attributes:

1) The data block is aligned to a 16-byte boundary. Aligning data at 16-byte boundaries enhances processor performance by speeding up data transfers. The 16-byte boundaries can accommodate 64-bit and 128-bit data transfers without the penalty incurred by misaligned transfers. Furthermore, misaligned data are more likely to span across cache lines causing more data transfers between the memory and the cache subsystems. To generalize, the data is aligned such that the different data transfer sizes do not require a misaligned access (e.g., aligned on X-byte boundaries with X/I-bit data transfers where I and X/I are integers).

2) The format is constant for all the operational modes of the processor and the operand sizes. The constant format facilitates software development, simplifies hardware structure, and speeds up the data transfers. Typical IA processors' modes include protected mode and real-address mode. Typical operand sizes are 16-bit, 32-bit and 128-bit. By having the same format for all modes and operand sizes, the need for checking the particular mode or size is eliminated, reducing the overhead in microcode.

The data structure 300 includes 512 bytes organized into groups of 128 bits or 16 bytes. The data structure 300 includes a first group 310, a second group 312, eight aliased register locations $320_0$ through $320_7$, eight 128-bit extended register locations $330_0$ through $330_7$, and reserved locations $350_0$ through $350_N$.

The first group 310 comprises 16 bytes as follows:

Bytes 0–1: Floating-Point Unit Control Word (FCW). The 16-bit FCW controls the precision of the Floating Point Unit (FPU), the rounding method used, and contains the exception-flag mask bits.

Bytes 2–3: FPU Status Word (FSW).

Bytes 4–5: FPU Tag Word (FTW). The 16-bit tag word contains the valid bits for 8 registers in the FPU data-register stack. A valid bit is used to indicate if the corresponding floating-point number in the FP register is valid. There are 8 valid bits. The remaining 8 bits are not used and are reserved for future use. Storing the 8 valid bits instead of eight 2-bit encodings is efficient because the processor actually stores the 8-bit value. The generation of eight 2-bit encodings is time consuming because it involves the use of the 8-bit value and each of the FP stack data values as input, which leads to a number of serially dependent operations that combine the valid bits with the FP stack data in a number of shifts, OR's, and rotates. Storing the 8 valid bits directly is much simpler and more efficient.

Bytes 6–7: FPU Operation (FOP). The lower 11 bits contain the opcode of the FP instruction, and the upper 5 bits are reserved.

Bytes 8–11: Instruction Pointer (IP). In 32-bit mode, the IP is the 32-bit IP offset. In 16-bit mode, the lower 16 bits are the IP offset and the upper 16 bits are reserved.

Bytes 12–13. Code Segment (CS) Selector

Bytes 14–15: Reserved.

The second group 312 comprises 16 bytes as follows:

Bytes 0–3: Data Pointer (DP). In 32-bit mode, the DP is the 32-bit DP offset. In 16-bit mode, the lower 16 bits are the DP offset and the upper 16 bits are reserved.

Bytes 4–5: Data Segment (DS) Selector.

Bytes 6–7: Reserved.

Bytes 8–11: (MXCSR). Control and status register location for the extended instructions. The MXCSR control/status register is used to enable masked/unmasked exception handling, to set rounding modes, to set flush-to-zero mode, and to view exception status flags.

Bytes 12–15: Reserved.

The eight aliased register locations $320_0$ through $320_7$ contain the floating-point registers ST0 through ST7. These floating-point registers are aliased into the SIMD integer packed data registers MM0 through MM7, respectively. In one embodiment, each of the aliased register locations corresponds to either an 80-bit floating-point number or a 64-bit integer packed data. Each of the eight aliased register locations $320_0$ through $320_7$ comprises 16 bytes as follows:

Bytes 0–9: Floating-point and integer packed data registers (STi/MMi, where i=0, . . . , 7)

Bytes 10–15: Reserved.

The eight extended register locations $330_0$ through $330_7$ contain the extended registers XMM0 through XMM7, respectively. In one embodiment, each of the extended registers contain four 32-bit floating-point numbers. Each of the eight extended registers comprises the entire 16 bytes.

The register locations $350_0$ through $350_N$ are reserved for future use.

To save the processors' state to the memory, the processor executes a single instruction, FXSAVE. This instruction performs the transfer of contents of registers associated with the floating-point unit (FPU), extended data packed units, and other control/status information according to the format shown in FIG. 3. In addition, the contents of these registers remain uninitialized, i.e., they remain unchanged. Initialization is moot in most cases because the FXSAVE is typically followed by the FXRSTOR which would overwrite any initialized state. Without the need of executing an initialization routine, the FXSAVE instruction can be executed efficiently.

To restore the processor's state that has been saved by the FXSAVE instruction, the processor executes the single restore state instruction, FXRSTOR. This instruction transfers the contents of the memory to the corresponding registers.

The saving and restoring of the processor's state are most commonly performed during task switching where one task is switched out and another task is switched in.

FIG. 4 illustrates the operation of a task switching according to one embodiment of the invention.

Upon START, the system process P400 enters block B410. In block B410, the task switch (TS) flag is reset, i.e., TS is loaded with 0. This indicates that a task switching has not occurred. The process P400 then enters block B415 in which task A is running. At block B420, it is determined if task A is pre-empted by task B. If NO, then it is determined if task A has been completed. If task A has been completed, the process P400 is terminated. If task A has not been completed, the process P400 goes back to block B415 to continue running task A.

If task A is pre-empted by task B, then the process block B400 enters block B430. In block B430, task A is switched out and task B is switched in. Then the TS flag is set, i.e., TS is loaded with 1, in block B435 to indicate that a task switching has occurred. While the OS will store part of the processor state for task A, the OS has the option of saving the state shown in FIG. 3 (the aliased registers, extended registers, and associated control and status information etc.) referred to as the "optional state". In particular, the operating system may either save the optional state for task A regardless of whether task B utilizes the aliased or extended registers or save the optional state for task A only if and when task B utilizes the aliased or extended systems. In one embodiment shown in FIG. 4, the process P400 saves the optional state of task A in block B440. The state of task S is saved by executing the instruction "FXSAVE".

The process P400 then enters block B450. In block B450, task B is running. While task B is running, it is determined in block B455 if task B utilizes the aliased or extended registers by executing the associated instructions. If NO, it is then determined if task B is completed in block B460. If task B has not been completed, the process P400 returns back to block B450. If task B is completed, the process P400 enters block B465 to switch task A in. The state of task A is then restored in block B470 by executing the "FXRSTOR" instruction. The process P400 then returns back to block B410 to reset the task switch flag.

If in block B455, it is determined that task B utilizes the FPU and the packed data/extended packed data unit, the process P400 enters block B480 to determine if a task switch has occurred. If NO, i.e., if TS=0, then the process P400 returns back to block S450 to continue running task B. If YES, i.e., if TS=1, the process P400 enters block B485. In block B485, the process either restores the previous state by executing the FXRSTOR instruction, or initializes the state by executing the FINIT depending on the particular implementation of the operating system. The process P400 then enters block B490 to reset the TS flag to 0 so that block B485 would not be performed if task B executes an instruction related to the FPU, packed data/extended packed data again. The process P400 then returns back to block B450.

In one embodiment, the saving of task A in block B440 can be performed after block B480 when it is determined that task B first executes an FPU, packed data, or extended packed data instruction.

Various techniques can be used in conjunction with the saving and restoring of processor state responsive to switching of tasks. For example, some operating system store and restore all of the processor state on each task switch. However, it has been determined that there are often parts of the processor state that may not need to be stored (e.g., a task did not alter the state). To take advantage of the situations where the entire state does not need to be saved and/or restored, certain processors provide interrupts to the operating system to allow the operating system to avoid saving and restoring the entire processor state. In addition, the task switch flag bit may be associated with any of the register sets, including the aliased floating point/packed data registers and the extended registers. While certain examples of task switching techniques are described, the invention can be used with any task switching technique.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. A method comprising:
   decoding a single instruction by a processor, said processor capable of operating under a plurality of operational modes and operand sizes;
   in response to said decoding said single instruction
   transferring contents of a plurality of registers associated with at least a functional unit in the processor to a memory according to a predetermined format into a plurality of groups of data, each group of data being aligned at an address boundary which corresponds to a multiple of $2^N$ bytes, the contents excluding instructions of the processor, the predetermined format being constant for the plurality of operational modes and operand sizes and defining a data structure including control word for the at least functional unit; and
   retaining the contents of the plurality of registers after said transferring.

2. The method of claim 1 wherein said functional unit is one of a floating-point unit (FPU), a packed data unit, and an extended packed data unit.

3. The method of claim 2 wherein the contents include at least an FPU control word, an FPU status word, an FPU tag word, an FPU opcode, an instruction pointer, a code segment, a data pointer, a data segment, a packed data control and status word, an aliased set of floating-point and packed data, and a set of extended packed data.

4. The method of claim 1 wherein said plurality of operational modes include a protected mode and a real-address mode.

5. The method of claim 1 wherein said plurality of operand sizes include 16-bit and 32-bit.

6. The method of claim 3 wherein said transferring comprises transferring a plurality of valid bits in the FPU tag word, each of the valid bits corresponding to each of the registers associated with the FPU.

7. The method of claim 1 wherein N is a positive integer number greater than or equal to 2.

8. A method comprising:
   decoding a single instruction by a processor, said processor capable of operating under a plurality of operational modes and operand sizes; and
   in response to said decoding said single instruction
   accessing a plurality of groups of data saved in a memory, the plurality of groups of data being in a predetermined format in a memory and excluding instructions of the processor, each group being aligned at an address boundary which corresponds to a multiple of $2^N$ bytes, the predetermined format being constant for the plurality of operational modes and operand sizes and defining a data structure including control word for at least a functional unit in the processor, and
   transferring contents of the plurality of groups of data to a plurality of registers associated with the at least functional unit.

9. The method of claim 8 wherein said functional unit is one of floating-point unit (FPU), a packed data unit, and an extended packed data unit.

10. The method of claim 9 wherein the contents include at least an FPU control word, an FPU status word, an FPU tag word, an FPU opcode, an instruction pointer, a code segment, a data pointer, a data segment, a packed data control and status word, an aliased set of floating-point and packed data, and a set of extended packed data.

11. The method of claim 8 wherein said plurality of operational modes include a protected mode and a real-address mode.

12. The method of claim 8 wherein said plurality of operand sizes include 16-bit and 32-bit.

13. The method of claim 10 wherein said transferring comprises transferring a plurality of valid bits in the FPU tag word, each of the valid bits corresponding to each of the registers associated with the FPU.

14. The method of claim 8 wherein N is a positive integer number greater than or equal to 2.

15. An apparatus comprising:
    at least a functional unit in a processor, said processor capable of operating under a plurality of operational modes and operand sizes; and
    a plurality of registers having contents associated with the functional unit, the contents of the plurality of registers being transferred to a memory by a single instruction according to a predetermined format into a plurality of groups of data, each group of data being aligned at an address boundary which corresponds to a multiple of $2^N$ bytes, the contents excluding instructions of the processor, the predetermined format being constant for the plurality of operational modes and operand sizes and defining a data structure including control word for the at least functional unit.

16. The apparatus of claim 15 wherein the functional unit is one of a floating-point unit (FPU), a packed data unit, and an extended packed data unit.

17. The apparatus of claim 16 wherein the contents include at least an FPU control word, an FPU status word, an FPU tag word, an FPU opcode, an instruction pointer, a code segment, a data pointer, a data segment, a packed data control and status word, an aliased set of floating-point and packed data, and a set of extended packed data.

18. The apparatus of claim 15 wherein said plurality of operational modes include a protected mode and a real-address mode.

19. The apparatus of claim 15 wherein said plurality of operand sizes include 16-bit and 32-bit.

20. The apparatus of claim 15 wherein N is a positive integer number.

21. A system comprising:
a memory; and
a processor coupled to the memory, the processor capable of operating under a plurality of operational modes and operand sizes, the processor comprising:
at least a functional unit, and
a plurality of registers having contents associated with the functional unit, the contents of the plurality of registers being transferred to the memory by a single instruction according to a predetermined format into a plurality of groups of data, each group of data being aligned at an address boundary which corresponds to a multiple of $2^N$ bytes, the contents excluding instructions of the processor, the predetermined format being constant for the plurality of operational modes and operand sizes and defining a data structure including control word for the at least functional unit.

22. The system of claim 21 wherein the functional unit is one of a floating-point unit (FPU), a packed data unit, and an extended packed data unit.

23. The system of claim 22 wherein the contents include at least an FPU control word, an FPU status word, an FPU tag word, an FPU opcode, an instruction pointer, a code segment, a data pointer, a data segment, a packed data control and status word, an aliased set of floating-point and packed data, and a set of extended packed data.

24. The system of claim 21 wherein said plurality of operational modes include a protected mode and a real-address mode.

25. The system of claim 21 wherein said plurality of operand sizes include 16-bit and 32-bit.

26. The system of claim 21 wherein N is a positive integer number greater than or equal to 2.

* * * * *